UNITED STATES PATENT OFFICE.

NATHAN A. DYAR, OF LYNN, MASSACHUSETTS, ASSIGNOR TO N. A. DYAR AND S. D. WOODBURY.

IMPROVEMENT IN MASTIC ROOFING MATERIALS.

Specification forming part of Letters Patent No. 16,770, dated March 3, 1857.

*To all whom it may concern:*

Be it known that I, NATHAN A. DYAR, of Lynn, in the county of Essex and State of Massachusetts, have invented a new and useful composition to be applied as a covering to the sides and roofs of buildings, and for various other purposes; and I do hereby declare that the nature of the said composition is fully set forth in the following specification.

My invention consists in the employment of sulphuric acid wherewith to treat compositions containing hydrocarbons, the result being the production of a material or composition having body, elasticity, and other properties fitting it for various purposes, in manner as will be hereinafter fully described.

It is well known that of late years various roofing compositions have come into use, most of which are composed principally of tar and rosin, to which are sometimes added chalk, sand, and clay. These mixtures are, I believe, generally melted together and applied in a fluid state to such roofs as are inclined so slightly from a horizontal plane that the composition shall not "run" when the application is first made, sheets of paper, felt, or other fibrous material being first attached to the roof to be covered to prevent the composition from flowing through the open spaces in and between the boards of said roof. They are too fluid to be applied without the intervening sheathing, are too easily affected by the heat of the sun, and cannot readily be applied to surfaces having an inclination of more than ten degrees from the horizon.

For several years I have been engaged in endeavoring to produce a composition which might overcome these obstacles and be capable of application not only to any inclined surface, but to the upright sides of a building without the intervention of the fibrous material. In my many experiments I have produced and tried a great number of mixtures until I have, as I think, found one which will fully answer the requirements. My method of preparing it is substantially as follows: To a barrel of gas-tar (or about thirty-two gallons) I add about one hundred and eighty pounds of yellow ocher and about one gallon of whale-oil. I thoroughly incorporate these and then add to and mix with them fifty (or more) pounds of sulphuric acid, according to the consistency I wish the mixture to possess. The peculiar action of the sulphuric acid on the mixture of coal-tar with the oil and earthy base is to produce in its union with the hydrocarbon of the coal-tar an elastic body, and the quantity of acid used must not be large enough to leave an acid reaction in the mass. The oil combines with the whole and acts as a solvent of the greasy part of the tar.

I have found that phosphoric and arsenic acid may be substituted for the sulphuric acid with somewhat similar effect, but generally prefer the latter.

The mixture, when thus prepared, is ready for immediate application to any horizontal, inclined, or upright surfaces for which it is intended, the proportion of sulphuric acid used in the composition being varied according to the inclination of the surface to which it is to be applied. For upright or very steep surfaces the quantity of acid has to be much greater than for horizontal or but slightly-inclined ones. I generally apply it by means of a trowel, much in the same manner in which common mortar or plaster is applied. After its application it gradually becomes very tough and hard, though retaining its elasticity to such extent as to give and yield to the shrinkage or opening of the boards to which it may be applied without any rupturing. When I wish the composition to become very hard I add to and mix with it a small quantity of oil of turpentine, which has the desired effect. Sand is to be sifted over the composition after its application, to make a foothold, and it then makes an excellent protection from fire, as it is very hard to inflame when it has been exposed for a short time.

I would remark that though the proportions I have named above are about the ones I have generally used, they may be, perhaps, varied without detriment. I would also remark that other earths than yellow ocher may be used, as may also some other fish-oils, some other acids, and some other tars than those above mentioned; but I have as yet found nothing that fully answers in place of the particular oil, tar, or acid mentioned.

This composition has been applied by me to an exposed surface for two years, and does not crack, melt, break, or let air or water through it, and seems, with the exception of having become very hard, to retain all its properties as at its first application. It may be applied to advantage as a cement for cellar bottoms or walls, or to stop crevices in exposed situations, and there are many other purposes to which it may be applied, to which I will not now further allude.

I claim—

The employment of sulphuric acid, or an acid having a similar effect, in the treatment of substances or compositions containing hydrocarbons, in the manner and for the purposes essentially as above described.

In testimony whereof I have hereto set my signature this 11th day of November, A. D. 1856.

NATHAN A. DYAR.

Witnesses:
   FRANCIS GOULD,
   S. H. WOODBURY.